(12) United States Patent
Obara

(10) Patent No.: US 6,965,493 B2
(45) Date of Patent: Nov. 15, 2005

(54) HYDRODYNAMIC PRESSURE BEARING SYSTEM AND SPINDLE MOTOR USING THE SAME

(75) Inventor: Rikuro Obara, Miyota-machi (JP)

(73) Assignee: Minebea Co., Ltd., Kitasaku-Gun (JP)

(*) Notice: Subject to any disclaimer, the term of this patent is extended or adjusted under 35 U.S.C. 154(b) by 0 days.

(21) Appl. No.: 10/314,318

(22) Filed: Dec. 9, 2002

(65) Prior Publication Data
US 2003/0107840 A1 Jun. 12, 2003

(30) Foreign Application Priority Data
Dec. 12, 2001 (JP) ........................................ 2001-378664

(51) Int. Cl.$^7$ ............................................... G11B 17/02
(52) U.S. Cl. ...................... 360/99.08; 310/90; 384/100
(58) Field of Search .......................... 360/99.08, 99.06, 360/98.07; 384/100–124, 132, 133; 310/90, 90.5, 40 R

(56) References Cited
U.S. PATENT DOCUMENTS
4,700,510 A * 10/1987 Namba et al. .............. 451/294
* cited by examiner Primary Examiner—Robert S. Tupper
(74) Attorney, Agent, or Firm—Oliff & Berridge, PLC

(57) ABSTRACT

A shaft secured to a hub is inserted and rotatably supported in a sleeve secured to a base. A dynamic pressure groove is formed in the inner peripheral surface of the sleeve, and lubricant is sealed between the shaft and the sleeve. The rotation of the shaft causes dynamic pressure to generate in the lubricant due to the dynamic pressure groove, supporting the shaft floatingly. The crystallized-glass sleeve allows heat generated in a coil to be hardly transferred to the shaft, thereby reducing the variations in the clearance between the shaft and the sleeve due to temperature changes to a minimum in cooperation with the crystallized-glass sleeve with a low thermal expansion coefficient. Finishing accuracy of the bearing surface can be improved by chemical polishing. Consequently, the rotation accuracy can be improved and the leakage of lubricant due to the variations in the clearance can be prevented.

3 Claims, 2 Drawing Sheets

HYDRODYNAMIC PRESSURE BEARING SYSTEM AND SPINDLE MOTOR USING THE SAME

BACKGROUND OF THE INVENTION

1. Field of the Invention

The present invention relates to a hydrodynamic pressure bearing system for a spindle motor or the like for driving a magnetic disk of a hard disk drive of a computer, and a spindle motor using the same.

2. Description of the Related Art

Recently, in hard disk drives of computers, bearings of spindle motors for driving magnetic disks are required to have high rotation accuracy, low friction, low noise, and long life as the magnetic disks have higher density and higher rotation speed. In order to achieve such requirements, spindle motor using a hydrodynamic pressure bearing system are developed.

The hydrodynamic pressure bearing system seals fluid between a shaft and a sleeve for supporting the shaft, and forms dynamic pressure grooves at the caliber of the sleeve, thereby generating dynamic pressure in the fluid by the rotation of the shaft and supporting the shaft in a floating manner by the dynamic pressure. The hydrodynamic pressure bearing system has a fluid layer formed between the shaft and the sleeve, and can thus support the shaft without mechanical friction by keeping them from contact with each other. Therefore, high rotation accuracy, low friction, low noise, and long life can be achieved.

However, the conventional hydrodynamic pressure bearing systems have the following problems: In general, the shafts and the sleeves of hydrodynamic pressure bearing systems of spindle motor for hard disk drives are made of stainless steel, having a high thermal coefficient of expansion, thus causing change in dimension with temperature to vary the clearance therebetween. The variations in the clearance between the shaft and the sleeve exerts a direct influence on the dynamic pressure of the fluid, causing a decrease in rotation accuracy and also the leakage of the fluid sealed in the clearance. In this case, since the shaft or sleeve on the coil side of the spindle motor easily increases in temperature, causing a temperature gradient between the shaft and the sleeve and increasing dimensional differentials due to thermal expansion, thus posing a serious problem.

Since the clearance at the rotating portion of the hydrodynamic pressure bearing system is extremely small, the existence of fine foreign matter generates friction to cause defects such as abnormal rotation and locking. Also, when there is roughness on the surfaces of portions forming the clearance, foreign matter such as fine burrs formed during processing may drop into the clearance during the use of the bearing system. Therefore, it is necessary to polish the surfaces of the portions forming the clearance to a mirror-smooth state after cutting, incurring high cost.

SUMMARY OF THE INVENTION

The present invention has been made in consideration of the above problems, and accordingly, it is an object of the present invention to provide a hydrodynamic pressure bearing system capable of reducing the variations in the clearance between a rotating member and a supporting member due to thermal expansion to a minimum and increasing the finishing accuracy of clearance forming portions, and a spindle motor using the same.

In order to solve the above problems, in the invention according to a first aspect of the present invention, a hydrodynamic pressure bearing system includes a supporting member and a rotating member, wherein fluid is sealed between the supporting member and the rotating member, the supporting member and the rotating member are floatingly supported by dynamic pressure generated in the fluid by the rotation of the rotating member, and wherein at least one of the supporting member and the rotating member is made of crystallized glass.

With such a configuration, the thermal expansion coefficient of the supporting member or the rotating member made of crystallized glass becomes low, and thermal transfer to other members can be reduced due to an insulation feature of the crystallized glass. Furthermore, the finishing accuracy of the surface of the bearing can be improved by chemical polishing or the like.

In the hydrodynamic pressure bearing system according to the first aspect of the invention, the heated side of the supporting member and the rotating member is made of crystallized glass.

With such a configuration, the thermal expansion coefficient of the heated side of the supporting member and the rotating member becomes low, and also thermal transfer to other members can be reduced.

In the invention according to a second aspect of the present invention, in a spindle motor using a hydrodynamic pressure bearing system comprising a supporting member and a rotating member, fluid is sealed between the supporting member and the rotating member, and the supporting member and the rotating member are floatingly supported by dynamic pressure generated in the fluid by the rotation of the rotating member, wherein at least one of the supporting member and the rotating member is made of crystallized glass.

With such a configuration, the thermal expansion coefficient of the supporting member or the rotating member made of crystallized glass becomes low, and also thermal transfer to other members is reduced due to an insulation feature of the crystallized glass. Furthermore, the finishing accuracy of the surface of the bearing can be improved by chemical polishing or the like.

In the spindle motor according to the second aspect of the invention, out of the supporting member and the rotating member, the side to be heated with a coil of the spindle motor is made of crystallized glass.

With such a configuration, out of the supporting member and the rotating member, the thermal expansion coefficient of the one heated by the coil becomes low, and the heat of the coil is hardly transferred to other members due to the insulation feature of the crystallized glass.

In claims and this description, making each member of crystallized glass includes making the surfaces of the members of crystallized glass.

DESCRIPTION OF THE PREFERRED EMBODIMENTS

Embodiments of the present invention will be specifically described hereinbelow with reference to the drawings.

Figure 1:
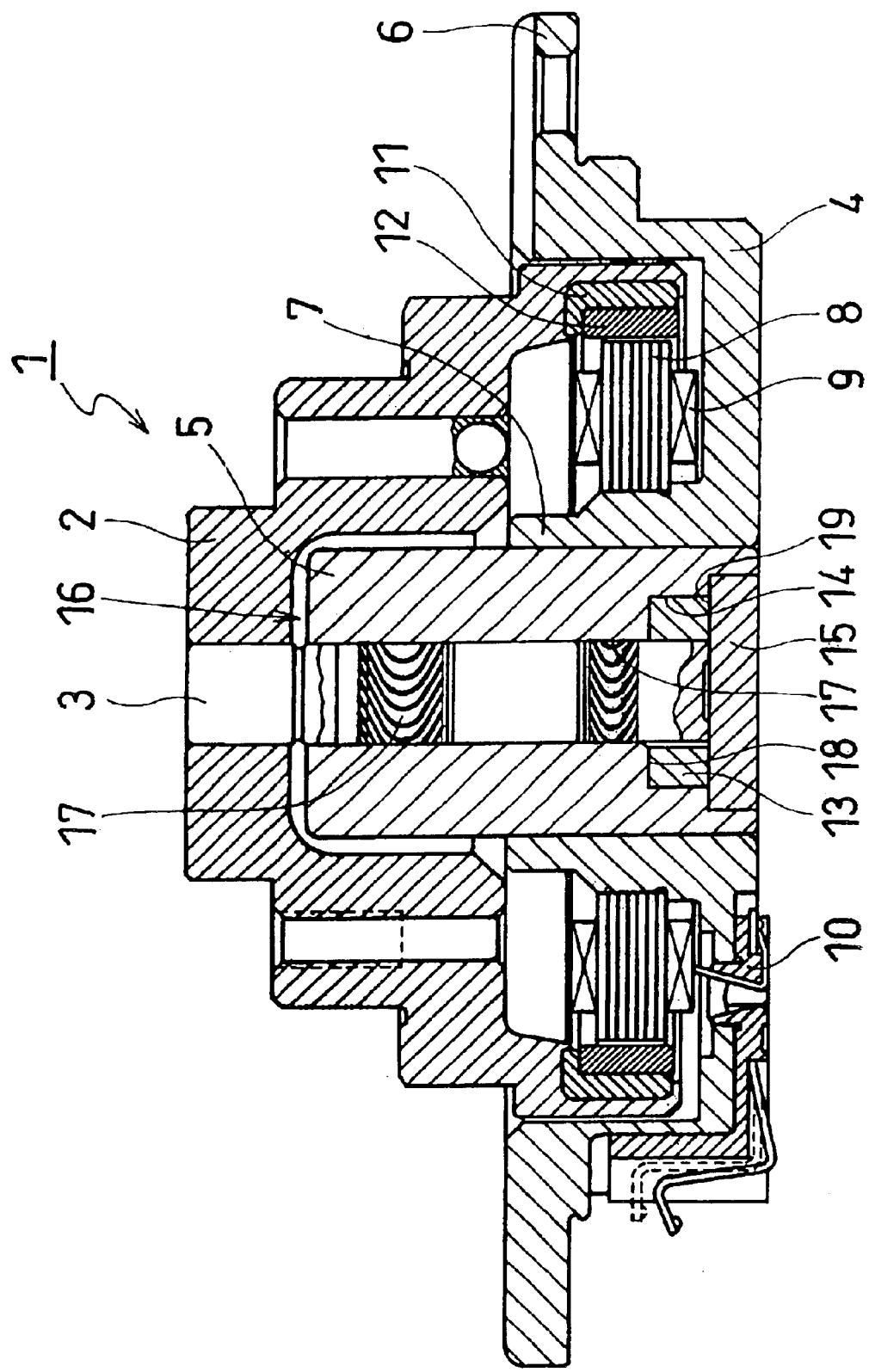
FIG. 1 is a longitudinal sectional view of a spindle motor according to a first embodiment of the present invention.

Referring to FIG. 1, a first embodiment of the invention will be discussed. As shown in FIG. 1, a spindle motor 1 according to this embodiment uses a shaft rotating system for driving a magnetic disk in a hard disk drive of a computer or the like, wherein a shaft 3 (rotating member) secured to a hub 2 side is rotatably supported by a cylindrical sleeve 5 (supporting member) secured to a base 4 side.

The base 4 has a substantially cylindrical shape with a bottom and has a flange 6 at the rim thereof, wherein a sleeve 5 is press fitted and fixed in a cylindrical portion 7 formed at the center of the bottom. The cylindrical portion 7 has a stator stack 8 attached at the outside periphery thereof, the stator stack 8 being arranged in a ring shape and extending radially, and a coil 9 is wound around the stator stack 8. The base 4 has a connector 10 connected to the coil 9.

The hub 2 has a substantially cylindrical shape with a bottom and a stepped side, wherein the shaft 3 is press fitted in an opening at the center of the bottom, wherein a ring-shaped yoke 11 is attached to the inner periphery of the outermost side wall, and wherein a ring-shaped magnet 12 is attached to the inside of the yoke 11. The hub 2 is fitted into the base 4 with a predetermined clearance between the outermost side thereof and the base 4. The shaft 3 is rotatably inserted into the sleeve 5 on the base 4 side, and is rotatably supported with respect to the base 4 with the inner periphery of the magnet 12 facing the outer periphery of the stator stack 8.

At the end of the shaft 3 inserted into the sleeve 5 is attached a thrust plate 13 and is rotatably fitted in a large-diameter portion 14 in the sleeve 5. The thrust plate 13 and the shaft 3 are supported by the end surface of the large-diameter portion 14 and a counter plate 15, which is press fitted, secured, and sealed into the end of the sleeve 5, in an axial direction with a small clearance.

Subsequently, a hydrodynamic pressure bearing system 16, which rotatably supports the shaft 3 and the sleeve 5, will be described. A dynamic pressure groove 17 is formed in the inner peripheral surface of the sleeve 5; a dynamic pressure groove 18 is formed in a surface of the large-diameter portion 14 of the sleeve 5, which faces the thrust plate 13; and a dynamic pressure groove 19 is formed in a surface of the counter plate 15, which faces the thrust plate 13. Lubricating oil (fluid) is sealed in the clearances between the shaft 3 and the thrust plate 13, and the sleeve 5 and the counter plate 15. When the shaft 3 and the thrust plate 13 are rotated in a predetermined direction, dynamic pressure is generated in the lubricating oil due to the dynamic pressure grooves 17, 18, and 19, and accordingly, the shaft 3 and the thrust plate 13 are floatingly supported with respect to the sleeve 5 and the counter plate 15 due to the dynamic pressure.

In the hydrodynamic pressure bearing system 16, the sleeve 5 is made of crystallized glass, and the shaft 3, the thrust plate 13, and the counter plate 15 are made of stainless steel. Alternatively, any of the shaft 3, the thrust plate 13, and the counter plate 15 may be made of crystallized glass, and when there is the possibility of contact with or exposure to a chemical gas of chemical equipment, all of them may be made of crystallized glass. Alternatively, in place of making the whole members of crystallized glass, it is possible that the substrate is made of stainless steel, on which crystallized glass layer is formed. It is preferable that the crystallized glass to be used here have higher insulation and lower thermal expansion coefficient than stainless steel, and sufficient mechanical strength, corrosion resistance, and workability to be used as a sleeve 5, a shaft 3, a thrust plate 13, and a counter plate 15. For example, it is possible to use high-silicate glass, soda-lime glass, aluminosilicate glass, borosilicate glass, alkali silicate glass or the like.

Subsequently, a method for manufacturing the sleeve 5, the shaft 3, the thrust plate 13, and the counter plate 15, which are made of crystallized glass, will be described.

The method of forming all the members of crystallized glass is as follows: First, a glass material prepared to have a predetermined composition is melted at a predetermined temperature (about 1450 to 1650° C.) in an electric melting furnace. The melted glass material is filled in a die, thereby obtaining a mold of almost the same shape as each member. Next, after the mold has been worked (cut and polished) into a predetermined finished dimension, it is subjected to heat treatment at a predetermined temperature (about 1000 to 1600° C.) according to the kind of glass, thereby making it polycrystal. Furthermore, mirror finishing is performed by carrying out chemical polishing using, for example, hydrofluoric solvent, as necessary, and in some cases, surface denaturing process is performed by ion exchange for chemical reinforcement.

The method of forming the surface of each member of crystallized glass is as follows: First, a substrate with a finished dimension about 0.5 mm to several millimeters smaller than a predetermined dimension of an appropriate material (for example, stainless steel), onto the surface of which oxidation treatment is subjected to increase adhesion strength with a glass layer. Glass slurry is prepared to have a predetermined composition by mixing glass powders. The glass slurry is adhered onto the surface of the substrate into a predetermined thickness by a spray method or a dipping method, and after being dried, it is subjected to baking treatment at a predetermined temperature (for example, 1500° C. or more) according to the kind of glass in a heating furnace. After that, in a manner similar to the above, after it has been worked (cut and polished) into a predetermined finished dimension, it is subjected to heat treatment at a predetermined temperature (about 1000 to 1600° C.) according to the kind of glass, thereby making it polycrystal. Furthermore, chemical polishing with fluoric-acid based solvent or the like, and surface denaturing process are performed by ion exchange for chemical reinforcement as necessary.

The operation of this embodiment as configured above will be described hereinbelow.

A magnetic disk (not shown) is mounted on the stepped outer periphery of the hub 2 and is rotated with the hub 2 by applying electric current to the coil 9, thereby writing and reading data with a magnetic head (not shown). At that time, when the shaft 3 is rotated in a predetermined direction, dynamic pressure is generated in the lubricating oil sealed into the clearances between the shaft 3 and the thrust plate 13, and the sleeve 5 and the counter plate 15 due to the dynamic pressure grooves 17, 18, and 19, and the dynamic pressure brings them into non-contact with each other, thereby forming a bearing system without mechanical friction. Accordingly, high rotation accuracy, low friction, low noise, long life, and high-speed rotation can be achieved.

Since the sleeve 5 is made of crystallized glass, heat generated in the coil 9 is hardly transferred to the shaft 3, the thrust plate 13, and the counter plate 15 due to the insulative feature of the crystallized glass, the heat expansion thereof can be reduced. Accordingly, the variations in the clearance at the rotating portion of the hydrodynamic pressure bearing system 16 due to temperature changes can be reduced to a minimum in cooperation with the sleeve 5 made of crystallized glass with a low thermal expansion coefficient.

Consequently, the rotation accuracy can be improved, and also the leakage of the lubricant due to the variations in the clearance can be prevented.

Furthermore, when any of the shaft 3, the thrust plate 13, and the counter plate 15 is made of crystallized glass, the thermal expansion coefficient thereof can be decreased; therefore, the variations in the clearance at the rotating portion of the hydrodynamic pressure bearing system 16 due to temperature changes can be further reduced. The dynamic pressure grooves 17, 18, and 19 can be formed of a member that is appropriately selected from a member made of crystallized glass and a member made of stainless steel in consideration of workability. Also, by making all the members of crystallized glass, the thermal expansion and thermal transfer can be reduced to a minimum.

Since a rotating portion of the hydrodynamic pressure bearing system 16 is made of crystallized glass, mirror finishing can easily be performed by chemical polishing or the like. Also, since a clear finished surface can be obtained, problems of surface roughness and the drop of foreign matter such as burrs can be solved, surely preventing the occurrence of defects including abnormal rotation and locking of the rotating portion. Also, since the substrate of each member is made of stainless steel or the like, on the surface of which a crystallized glass layer is formed, mechanical strength to an impact or the like can be increased.

Subsequently, referring to FIG. 2, a second embodiment of the invention will be described. Elements similar to those of the first embodiment are given the same reference numerals and only different elements will be described in detail.

Figure 2:
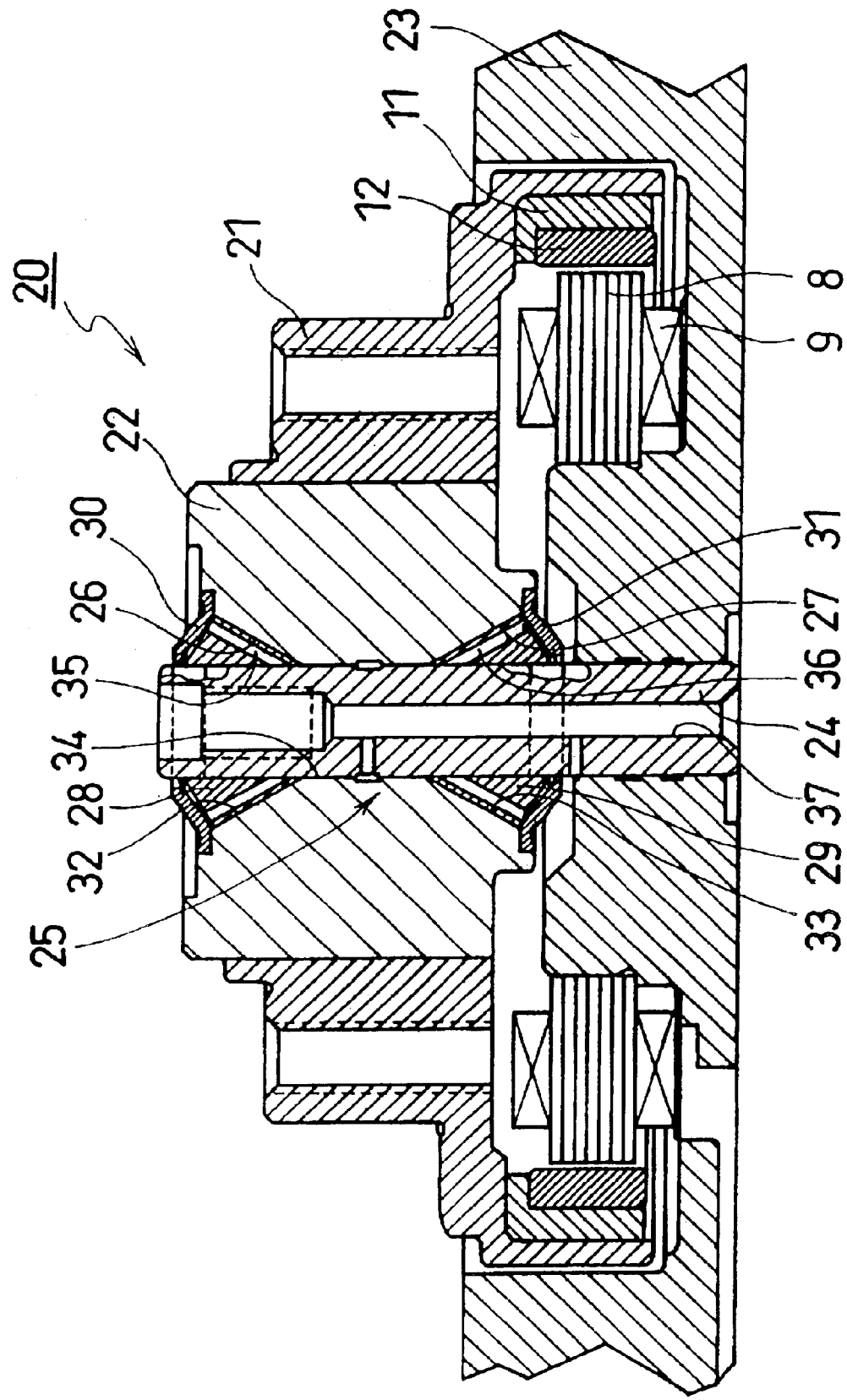
FIG. 2 is a longitudinal sectional view of a spindle motor according to a second embodiment of the present invention.

As shown in FIG. 2, a spindle motor 20 according to the second embodiment uses a fixed shaft system, wherein a sleeve 22 (rotating member) secured to a hub 21 side is rotatably supported by a shaft 24 (supporting member) secured to a base 23 side.

The base 23 has a substantially cylindrical shape with a bottom, wherein a shaft 24 is press fitted and secured by bonding in an opening formed at the center of the bottom. The stator stack 8 arranged in a ring shape and extending radially is attached to a ring-shaped recessed portion formed around a shaft mounting portion, and the coil 9 is wound around the stator stack 8. The base 23 has a connector (not shown) to be connected to the coil 9, attached thereto.

The hub 21 has a substantially cylindrical shape with a bottom and a stepped side, wherein the cylindrical sleeve 22 is press fitted and secured by bonding in an opening formed at the center of the bottom, wherein the ring-shaped yoke 11 is attached to the inner periphery of the outermost side wall of the hub 21, and wherein the ring-shaped magnet 12 is fitted and attached to the inside of the yoke 11. The hub 21 is fitted into the base 23 with a predetermined clearance between the outermost side thereof and the base 23. The shaft 24 is rotatably inserted into the sleeve 22 on the base 23 side, and is rotatably supported with respect to the base 23 with the inner peripheral surface of the magnet 12 facing the outer periphery of the stator stack 8.

Subsequently, a hydrodynamic pressure bearing system 25, which rotatably supports the sleeve 22 and the shaft 24, will be described. The sleeve 22 has tapered surfaces 26 and 27 expanding outwards formed at both ends on the inner peripheral surface thereof. Cones 28 and 29 having conic surfaces facing the tapered surfaces 26 and 27 of the sleeve 22, respectively, are fitted and secured into the outer periphery of the shaft 24. The sleeve 22 and the shaft 24 are mutually and rotatably supported in an axial direction by the tapered surfaces 26 and 27 and the conic surfaces of the cones 28 and 29. The sleeve 22 has shields 30 and 31 for holding lubricating oil between the sleeve 22 and the shaft 24, attached at both ends thereof and in the proximity of the outer peripheral surface of the shaft 24.

The sleeve 22 has dynamic pressure grooves 32, 33, and 34 formed in the tapered surfaces 26 and 27 thereof and the inner peripheral surface therebetween. Lubricating oil is sealed in a space between the sleeve 22 and the shaft 24, spaces enclosed by the tapered surfaces 26 and 27, the cones 28 and 29, and the shields 30 and 31, respectively, and in oil passages 35 and 36. When the sleeve 22 is rotated in a predetermined direction, dynamic pressure is generated in the lubricating oil due to the dynamic pressure grooves 32, 33, and 34, which floatingly supports the sleeve 22 with respect to the shaft 22 and the cones 28 and 29. The shaft 24 is provided with an air vent 37 for introducing air between the sleeve 22 and the shaft 24 and balancing the pressure applied to the lubricating oil.

In the hydrodynamic pressure bearing system 25, the shaft 24 is made of crystallized glass, and the cones 28 and 29 and the sleeve 22 are made of stainless steel. Alternatively, any of the cones 28 and 29 and the sleeve 22 may be made of crystallized glass; and alternatively, all of them may be made of crystallized glass. The crystallized glass used in this embodiment and the manufacturing method thereof is the same as that of the first embodiment.

The operation of this embodiment as configured above will be described hereinbelow.

In a manner similar to the first embodiment, a magnetic disk (not shown) is mounted on the stepped outer periphery of the hub 21 and is rotated with the hub 21 by the introduction of electric current to the coil 9, thereby writing and reading data with a magnetic head (not shown). At that time, when the sleeve 22 is rotated in a predetermined direction, dynamic pressure is generated in the lubricating oil sealed in the clearance between the sleeve 22 and the shaft 24, and the clearance between the cones 28 and 29 and the shields 30 and 31 due to the dynamic grooves 32, 33, and 34, which brings them into non-contact with each other, thereby forming a bearing system without mechanical friction. Accordingly, high rotation accuracy, low friction, low noise, long life, and high-speed rotation can be achieved.

Since the shaft 24 is made of crystallized glass, heat generated in the coil 9 is hardly transferred to the cones 28 and 29 and the sleeve 22 due to the insulative feature of crystallized glass; therefore, the heat expansion of the cones 28 and 29 and the sleeve 22 can be reduced. Accordingly, the variations in the clearance at the rotating portion of the hydrodynamic pressure bearing system 25 due to temperature changes can be reduced to a minimum in cooperation with the shaft 24 made of crystallized glass with a low thermal expansion coefficient. Consequently, the rotation accuracy can be improved, and also the leakage of the lubricating oil due to the variations in the clearance can be prevented.

Furthermore, when either the cones 28 and 29 or the sleeve 22 is made of crystallized glass, the thermal expansion coefficient thereof can be decreased; as a result, the variations in the clearance at the rotating portion of the hydrodynamic pressure bearing system 25 due to temperature changes can be further reduced. The dynamic pressure grooves 32, 33, and 34 can be formed of a member that is appropriately selected from a member made of crystallized glass and a member made of stainless steel in consideration of workability. Also, by making all the members of crystallized glass, the thermal expansion and thermal transfer can be reduced to a minimum.

Since a rotating portion of the hydrodynamic pressure bearing system 25 is made of crystallized glass in a manner similar to the first embodiment, mirror finishing can easily be performed by chemical polishing or the like. Also, since a clear finished surface can be obtained, problems of surface roughness and the drop of foreign matter such as burr can be solved, surely preventing the occurrence of defects including abnormal rotation and locking of the rotating portion. Also, since the substrate of each member is made of stainless steel or the like, on the surface of which a crystallized glass layer is formed, mechanical strength to an impact or the like can be increased.

As specifically described above, in the hydrodynamic pressure bearing system according to the first aspect of the invention, since at least one of the supporting member and the rotating member is made of crystallized glass, the thermal expansion coefficient of the supporting member or the rotating member made of crystallized glass becomes low, and also since thermal transfer to other members can be reduced, the variations in the clearance between the supporting member and the rotating member due to temperature changes can be reduced. Furthermore, mirror finishing of the bearing can easily be performed by chemical polishing or the like, thereby improving working accuracy and providing a clear finished surface. Consequently, the rotation accuracy can be improved and also the leakage of the fluid due to the variations in the clearance between the supporting member and the rotating member due to temperature changes can be prevented.

In the hydrodynamic pressure bearing system according to the first aspect of the invention, since the heated side of the supporting member and the rotating member is made of crystallized glass, the thermal expansion coefficient of the heated side becomes low, and also thermal transfer to other members is reduced, the variations in the clearance between the supporting member and the rotating member due to temperature changes can be reduced effectively.

In the spindle motor according to the second aspect of the invention, since at least one of the supporting member and the rotating member of the hydrodynamic pressure bearing system is made of crystallized glass, the thermal expansion coefficient of the supporting member or the rotating member made of crystallized glass becomes low, and also since thermal transfer to other members is reduced, variations in the clearance between the supporting member and the rotating member due to temperature changes can be reduced. Furthermore, mirror finishing of the bearing can easily be performed by chemical polishing or the like, thereby improving working accuracy and providing a clear finished surface. Consequently, the rotation accuracy can be improved and also the leakage of the fluid due to the variations in the clearance between the supporting member and the rotating member due to temperature changes can be prevented.

In the spindle motor according to the second aspect of the invention, since of the supporting member and the rotating member of the hydrodynamic pressure bearing system, the side to be heated with the coil is made of crystallized glass, the thermal expansion coefficient of the one heated by the coil becomes low, and the heat of the coil is hardly transferred to other members. Accordingly, the variations in the clearance between the supporting member and the rotating member due to temperature changes can be reduced effectively.

What is claimed is:

1. A hydrodynamic pressure bearing system comprising:

a supporting member; and a rotating member;

wherein fluid is sealed between the supporting member and the rotating member, the rotating member is floatingly supported by dynamic pressure generated in the fluid by a rotation of the rotating member, at least one of the supporting member and the rotating member is made of crystallized glass, and a heated side of the supporting member and the rotating member is made of crystallized glass.

2. A spindle motor using a hydrodynamic pressure bearing system comprising:

a supporting member; and a rotating member;

wherein fluid is sealed between the supporting member and the rotating member, the rotating member is floatingly supported by dynamic pressure generated in the fluid by a rotation of the rotating member, at least one of the supporting member and the rotating member is made of crystallized glass, and a heated side of the supporting member and the rotating member is made of crystallized glass.

3. The spindle motor according to claim 2, further comprising:

a coil that heats the heated side of the supporting member and the rotating member.

* * * * *